US010349431B2

(12) United States Patent
Arnold et al.

(10) Patent No.: US 10,349,431 B2
(45) Date of Patent: Jul. 9, 2019

(54) RADIO COMMUNICATION NETWORK WITH MULTI THRESHOLD BASED SLA MONITORING FOR RADIO RESOURCE MANAGEMENT

(71) Applicant: Deutsche Telekom AG, Bonn (DE)

(72) Inventors: Paul Arnold, Frankfurt am Main (DE); Jakob Belschner, Frankfurt am Main (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/811,818

(22) Filed: Nov. 14, 2017

(65) Prior Publication Data

US 2018/0152958 A1      May 31, 2018

(30) Foreign Application Priority Data

Nov. 28, 2016    (EP) .................................... 16200886

(51) Int. Cl.
*H04W 72/12*      (2009.01)
*H04L 12/24*      (2006.01)
(Continued)

(52) U.S. Cl.
CPC ..... *H04W 72/1231* (2013.01); *H04L 41/5009* (2013.01); *H04L 41/5025* (2013.01);
(Continued)

(58) Field of Classification Search
CPC ..... H04L 5/006; H04L 1/0002; H04L 1/0003; H04L 1/0009; H04L 1/20; H04L 27/0008;
(Continued)

(56) References Cited

U.S. PATENT DOCUMENTS

2003/0142631 A1*   7/2003   Silvester ............... H04L 1/0001
                                                      370/252
2005/0153702 A1*   7/2005   Cuffaro ................. H04W 16/08
                                                      455/452.1
(Continued)

FOREIGN PATENT DOCUMENTS

WO    WO 2016166725 A1    10/2016

OTHER PUBLICATIONS

Gramaglia Marco et al: "Flexible connectivity and QoE/QoS management for 5G Networks: The 5G NORMA view", 2016 IEEE International Conference on Communications Workshops (ICC), IEEE, May 23, 2016 (May 23, 2016), pp. 373-379, XP032919894.

(Continued)

*Primary Examiner* — Sai Aung
(74) *Attorney, Agent, or Firm* — Leydig, Voit & Mayer, Ltd.

(57) ABSTRACT

A radio communication network includes: a network orchestration entity, configured to orchestrate a plurality of network resources to set up at least one logical network of a plurality of logical networks based on a logical network-specific service level agreement (SLA); a radio scheduler, configured to schedule radio resources of the at least one logical network based on a scheduling strategy; a monitoring entity, configured to monitor performance information from the at least one logical network; and a controller, configured to: determine an SLA metric for the at least one logical network based on the monitored performance information from the at least one logical network; detect a threshold violation of the SLA metric with respect to a set of thresholds associated with the at least one logical network; and adjust the scheduling strategy based on the detected threshold violation.

18 Claims, 6 Drawing Sheets

(51) Int. Cl.
*H04W 28/02* (2009.01)
*H04W 72/04* (2009.01)

(52) U.S. Cl.
CPC ...... *H04L 41/5022* (2013.01); *H04L 41/5087* (2013.01); *H04W 28/0268* (2013.01); *H04W 72/0486* (2013.01)

(58) Field of Classification Search
CPC .. H04L 27/10; H04W 48/16; H04W 74/0816; H04W 52/0216; H04W 52/0235; H04W 52/241; H04W 72/04; H04W 72/0446
See application file for complete search history.

(56) References Cited

U.S. PATENT DOCUMENTS

| | | | |
|---|---|---|---|
| 2015/0281004 A1 | 10/2015 | Kakadia et al. | |
| 2017/0150513 A1* | 5/2017 | Abraham | H04W 72/1215 |
| 2018/0242264 A1* | 8/2018 | Pelletier | H04W 52/146 |
| 2018/0324827 A1* | 11/2018 | Abraham | H04W 72/1215 |

OTHER PUBLICATIONS

Peter Rost et al: "Functional Network Architecture and Security Requirements—5G NORMA D3.1 Deliverable", Dec. 31, 2015 (Dec. 31, 2015), XP055349097.

Yousaf Zarrar (nec) et al: "Definition of connectivity and QoE/QoS management mechanisms—intermediate report—5G NORMA D5.1 Deliverable", Nov. 30, 2016 (Nov. 30, 2016), XP055348936.

* cited by examiner

RADIO COMMUNICATION NETWORK WITH MULTI THRESHOLD BASED SLA MONITORING FOR RADIO RESOURCE MANAGEMENT

CROSS-REFERENCE TO RELATED APPLICATIONS

Priority is claimed to European Patent Application No. EP 16200886.6, filed on Nov. 28, 2016, the entire disclosure of which is hereby incorporated by reference herein.

TECHNICAL FIELD

The present disclosure relates to a radio communication network, in particular a 5G radio network, with multi threshold based SLA (Service Level Agreement) monitoring for radio resource management (RRM).

BACKGROUND

Constructing logical networks also referred to as network slicing is a key concept for next generation mobile communications networks such as 5G networks. Each network slice can be considered as a logical network with well-defined Service Level Agreements (SLAs), i.e. official commitments prevailing between a service provider and the customer about network services, quality, availability and responsibilities, based on a corresponding orchestration of required network resources. For the service provider it is essential to comply with the committed SLA not only to avoid possible penalties but to maintain scheduling of network resources and hence to keep the whole communication network stable. An unplanned re-orchestration of a network slice will be seen as the worst case situation by the network operator and should be avoided by all possible means.

SUMMARY

In an exemplary embodiment, the present invention provides a radio communication network. The radio communication network includes: a network orchestration entity, configured to orchestrate a plurality of network resources to set up at least one logical network of a plurality of logical networks based on a logical network-specific service level agreement (SLA); a radio scheduler, configured to schedule radio resources of the at least one logical network based on a scheduling strategy; a monitoring entity, configured to monitor performance information from the at least one logical network; and a controller, configured to: determine an SLA metric for the at least one logical network based on the monitored performance information from the at least one logical network; detect a threshold violation of the SLA metric with respect to a set of thresholds associated with the at least one logical network; and adjust the scheduling strategy based on the detected threshold violation.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
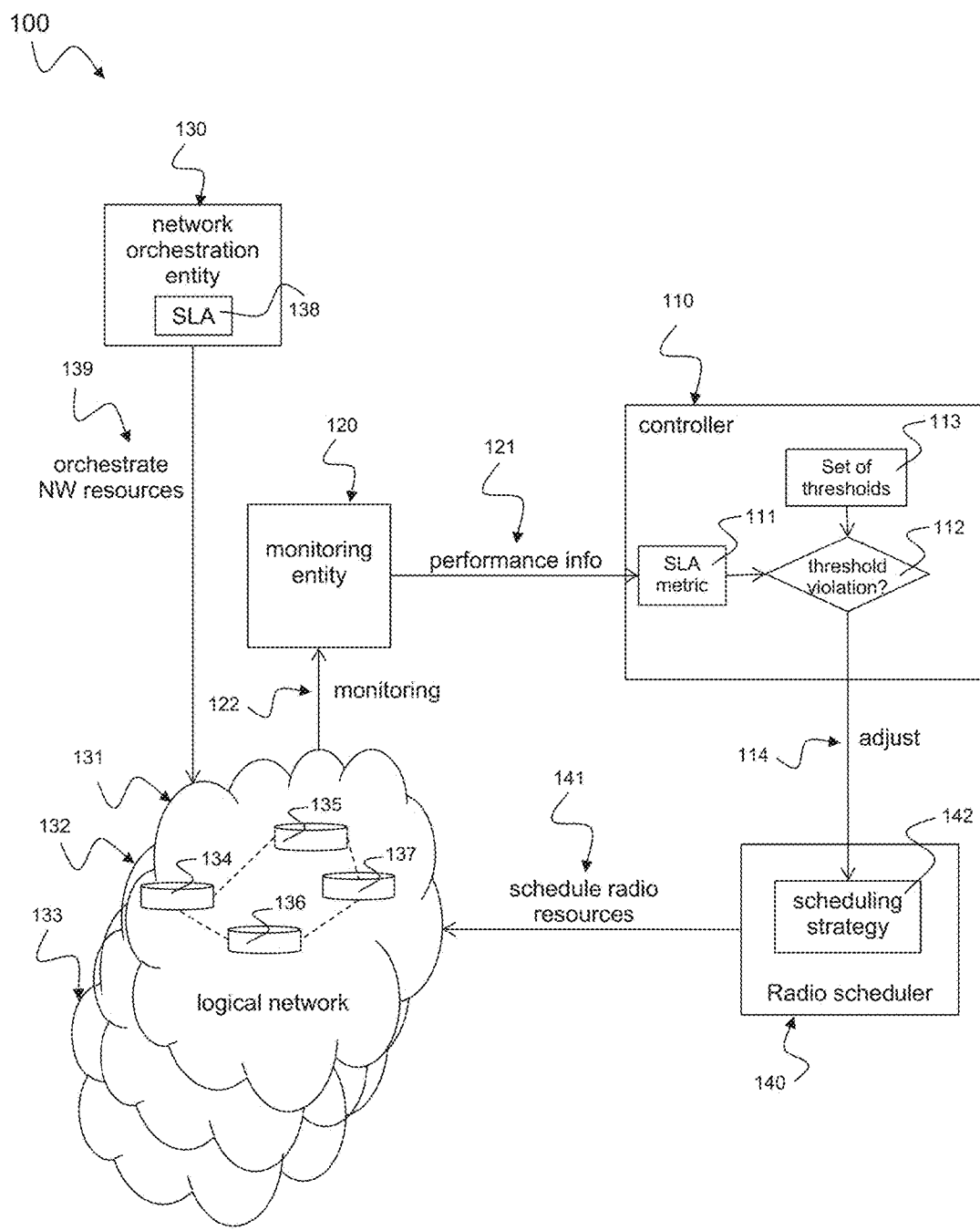
FIG. 1 shows a schematic diagram illustrating a radio communication network 100 according to the disclosure.

Exemplary embodiments of the invention provide for efficient and stable operation of a radio communication network, in particular in a next generation mobile network such as a 5G network, complying with the admitted SLAs as described above.

Exemplary embodiments of the invention utilize a logical entity monitoring a defined SLA metric and giving information to the Radio Resource Management (RRM) functions of the system, e.g. Admission Control (AC), Allocation and Retention Priority (ARP) and radio resource scheduler. Exemplary embodiments of the invention derive a scheduling strategy, e.g. by applying dynamic weights, based on the status of defined SLA metrics of multiple network slices. Therefore, multiple correlated thresholds per slice and across slices can be defined based on the slice specific SLA metric. Based on the differences between the intermediate SLA status and the thresholds, the scheduling strategy (or the dynamic weights, respectively) can be dynamically adapted to prioritize data flows when radio resources are allocated in order to optimize radio resource scheduling decision.

In order to describe the invention in detail, the following terms, abbreviations and notations will be used:

5G: fifth generation mobile network
5G NR: 5G New Radio
LTE: Long Term Evolution
BS, eNodeB: Base Station or radio cell
MCS: Modulation and Coding Scheme
UE: User Equipment
FSS: frequency selective scheduling
ICIC: inter-cell interference coordination
eICIC: enhanced inter-cell interference coordination
QoS: quality-of-service
SLA: service level agreement
CoMP: Coordinated Multi-Point
TPB: Transmission Point Blanking
CA: Carrier Aggregation
JT: Joint Transmission
HARQ: Hybrid automatic repeat request
MAC: Media Access Control layer
PHY: Physical layer
VNF: Virtual Network Function
DSP: Digital Signal Processor
KPI: Key Performance Indicator RRM: Radio Resource Management
AC: Admission Control
ARP: Allocation and Retention Priority
QCI: Quality Channel Indicator
TFT Traffic Flow Template
AIV: Air Interface Variant(s)
GBR: Guaranteed Bit Rate
TTI: Transmission Time Interval The communication systems, devices and methods described in the following may be based on service-level agreements (SLA) and SLA metrics. An SLA is defined as an official commitment that prevails between a service provider and the customer. Particular aspects of the service, such as quality, availability and responsibilities are agreed between the service provider and the service user. Services should be provided to the customer as agreed upon in the contract. Service providers and network operators will commonly include service level agreements within the terms of their contracts with customers to define the level(s) of service. The SLA may use technical definitions in terms of mean time between failures (MTBF), mean time to repair or mean time to recovery (MTTR); identifying which party is responsible for reporting faults or paying fees; responsibility for various data rates; throughput; jitter; or similar measurable details.

SLAs can include various service performance metrics or SLA metrics with corresponding service level objectives. Metrics commonly agreed to in these cases may include, for example, MIB (Management Information Base) variables of the IETF Structure of Management Information (SMI) such as system uptime, number of invocations, outage period or technical network performance metrics such as loss, utilization, delay, etc. which are collected via management directives such as management protocol messages, management interfaces, URIs, etc. Composite metrics use a specific function to average one or more metrics over a specific amount of time, for example average availability, or breaking them down according to certain criteria, for example minimum throughput, maximum response time, top 10%, etc.

According to a first aspect, the invention relates to a radio communication network, comprising: a network orchestration entity, configured to orchestrate a plurality of network resources to set up at least one logical network of a plurality of logical networks based on a logical network specific service level agreement (SLA); a radio scheduler configured to schedule radio resources of the at least one logical network based on a scheduling strategy; a monitoring entity, configured to monitor performance information from the at least one logical network; and a controller, configured: to determine an SLA metric for the at least one logical network based on the monitored performance information from the at least one logical network, to detect a threshold violation of the SLA metric with respect to a set of thresholds associated with the at least one logical network, and to adjust the scheduling strategy based on the detected threshold violation.

Such a radio communication network provides efficient and stable operation. The multi threshold based detection of threshold violations gives indications of possible performance and/or QoS bottlenecks in the radio communication network. An automatic escalation strategy can be implemented by the controller in order to increase availability of radio resources and to increase efficiency and stability of the network. Hence, an unplanned re-orchestration of a logical network or a network slice can be avoided.

In an implementation form of the radio communication network the scheduling strategy is based on applying a set of weights to the radio resources of the at least one logical network, and the controller is configured to adjust the scheduling strategy by adjusting the set of weights.

This provides the advantage that radio resources can be efficiently added if required by simply increasing the weights assigned to the radio resources.

In an implementation form of the radio communication network the controller is configured to increase the set of weights applied to the radio resources of the at least one logical network based on a first detected threshold violation.

This provides the advantage that a first detected threshold violation results in an increase of the weights, i.e. a provision of more radio resources for the logical network in order to relax a possible lack of resources that has caused the SLA metric reduction and thus the first detected threshold violation.

In an implementation form of the radio communication network the controller is configured to further increase the set of weights applied to the radio resources of the at least one logical network based on a second detected threshold violation.

This provides the advantage that an escalation strategy can be provided. When the second threshold violation is detected, a further increase of the weights results in a still higher availability of radio resources for the logical network in order to resolve the problem detected by the SLA metric.

In an implementation form of the radio communication network contexts of the thresholds of the set of thresholds associated with the at least one logical network are prioritized. A context of a threshold may relate to a radio resource allocation, i.e. an action of allocating (additional) radio resources to combat the threshold violation.

This provides the advantage that a violation of the second threshold which may have a higher priority than a first threshold will result in a much higher allocation of radio resources for the logical network than a violation of the first threshold. A violation of the first threshold may occur more often than a violation of the second threshold. Hence prioritization of the contexts of thresholds results in a higher efficiency of the radio communication network and a more stable performance.

A context for allocation of radio resources may be considered in this disclosure based on the three aspects: (ultra-)high throughput, (ultra-)low latency and (ultra-)high reliability. I.e. a violation of a threshold may result in an allocation of a higher amount of radio resources to increase throughput and/or in an earlier allocation of radio resources to reduce latency and/or in an allocation of more robust and reliable radio resources, e.g. by using redundant radio resources or by using more robust modulation and coding schemes to improve reliability.

In an implementation form of the radio communication network the controller is configured to indicate the radio scheduler switching a scheduling strategy for scheduling the radio resources based on detecting a specific number of threshold violations or based on detecting a threshold violation of a specific threshold of the set of thresholds.

This provides the advantage that a further escalation can be to switch the scheduling strategy in order to acquire stable performance.

In an implementation form of the radio communication network the radio scheduler is configured to switch the scheduling strategy for scheduling the radio resources responsive to the indication received from the controller.

This provides the advantage that the radio scheduler can automatically switch the scheduling strategy based on an indication from the controller.

In an implementation form of the radio communication network the controller is configured to indicate a detection of a specific number of threshold violations or a detection of a threshold violation of a specific threshold of the set of thresholds to the network orchestration entity.

This provides the advantage that the escalation strategy when detecting threshold violations can be flexibly defined and adapted.

In an implementation form of the radio communication network the network orchestration entity is configured to re-orchestrate the plurality of network resources responsive to the indication received from the controller.

This provides the advantage that a re-orchestration of one logical network or of the whole radio communication network can be initiated by the network orchestration entity upon indication from the controller. This may be the last escalation stage.

In an implementation form of the radio communication network the controller is configured to adjust the scheduling strategy according to a prioritization of data flows transported by the at least one logical network.

This provides the advantage that depending on a specific type or priority assigned to a data flow, this data flow may obtain more or less radio resources. A data flow marked with high priority may obtain a larger amount of radio resources while a data flow marked with low priority may obtain a lesser amount of radio resources.

In an implementation form of the radio communication network the controller is configured to adjust the scheduling strategy based on adjusting a QCI class of the data flows and/or based on a deviation of a monitored Key Performance Indicator (KPI) from a KPI determined by the SLA of the at least one logical network.

This provides the advantage that the scheduling strategy can be flexibly changed according to the requirements of the network. KPIs can be flexibly defined for a logical network of the whole radio communication network.

In an implementation form of the radio communication network distances between the thresholds of the set of thresholds associated with the at least one logical network are correlated.

This provides that advantage that a pre-known escalation strategy can be provided, i.e. an escalation strategy in which a distance between a first threshold violation, a second threshold violation, etc. is known and reproducible to the operator.

In an implementation form of the radio communication network the controller is configured to normalize a first SLA metric determined for a first logical network of the plurality of logical networks with respect to a second SLA metric determined for a second logical network of the plurality of logical networks according to a common evaluation strategy.

This provides the advantage that a threshold violation for a first logical network has the same meaning as a threshold violation for a second logical network. Both threshold violations are comparable and similar amount of resources can be provided to resolve the bottleneck.

In an implementation form of the radio communication network the controller is configured to adjust the scheduling strategy in the same manner when a threshold violation of a threshold associated with the first logical network and a corresponding threshold of different level associated with the second logical network is detected.

This provides the advantage that a common or a slice-specific escalation strategy for all logical networks of the radio communication network can be implemented, i.e. an escalation strategy which has the same meaning for a first logical network as for a second logical network. In particular the same amount of resources can be allocated for the first logical network as for the second logical network when a threshold of the first logical network is violated and a corresponding threshold of the second logical network is violated. Note that these corresponding thresholds do not have to be set at the same values. For example a threshold violation of a threshold set at a first level, e.g. 0.9 in a first logical network may correspond to a threshold violation of a threshold set at a second level, e.g. 0.7 in a second logical network. The same escalation strategy may be applied and the same amount of radio resources may be allocated to combat the threshold violation. In the above example, the SLA metric associated with the threshold set at 0.9 may have a higher fluctuation range than the SLA metric associated with the threshold set at 0.7. Note that the setting of thresholds as described in this disclosure also includes the setting of fluctuation ranges for the SLA metrics.

In an implementation form of the radio communication network the radio communication network comprises a network according to a fifth generation (5G) or according to a further generation, and the at least one logical network is a network slice of the 5G network communicating with a physical layer of the 5G network.

The 5G network increases the efficiency of communication and provides in particular a higher data throughput, lower latency, particularly high reliability, a much higher connection density and a larger mobility area. The 5G network increases the operational flexibility and provides tailored features and functions while saving network resources. This increased performance is accompanied by the ability to control highly heterogeneous environments and the ability to secure trust, identity and privacy of users.

According to a second aspect, the invention relates to a method for operating a radio communication network, the method comprising: orchestrating, by a network orchestration entity, a plurality of network resources to set up at least one logical network of a plurality of logical networks based on a logical network specific service level agreement (SLA); scheduling, by a radio scheduler, radio resources of the at least one logical network based on a scheduling strategy; monitoring, by a monitoring entity, performance information from the at least one logical network; and determining, by a controller, an SLA metric for the at least one logical network based on the monitored performance information from the at least one logical network, to detect a threshold violation of the SLA metric with respect to a set of thresholds associated with the at least one logical network, and to adjust, by the controller, the scheduling strategy based on the detected threshold violation.

Such a method provides efficient and stable operation of a radio communication network. The multi threshold based detection of threshold violations gives indications of possible performance and/or QoS bottlenecks in the radio communication network. An automatic escalation strategy can be implemented by the controller in order to increase availability of radio resources and to increase efficiency and stability of the network. Hence, an unplanned re-orchestration of a logical network or a network slice can be avoided.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The radio communication network as described hereinafter may include a plurality of different network entities. A network entity may be a computer host, a computer server or some network node. A network entity may be a hardware unit, e.g. a computer server, a network node or device, a PC, a tablet, a smartphone, a router, a gateway or a whole computer network. A network entity may be a software unit, e.g. an application program or software module on a PC, tablet, smartphone or any other hardware device.

The radio communication network or radio communication system or wireless communication network may be implemented by various technologies, in particular as a communication network based on mobile communication standards such as LTE, in particular LTE-A and/or OFDM and successor standards such as 5G. The components and network nodes of such a communication network described below may be implemented as electronic devices or electronic network entities. The described devices and network entities may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The described network components, in particular the radio cells and user equipments may be configured to transmit and/or receive radio signals and performing associated signal processing. Radio signals may be or may include radio frequency signals radiated by a radio transmitting device (or radio transmitter or sender) with a radio frequency lying in a range of about 3 kHz to 300 GHz. The frequency range may correspond to frequencies of alternating current electrical signals used to produce and detect radio waves.

The communication networks described herein after may be designed in accordance to mobile communication standards such as e.g. the Long Term Evolution (LTE) standard or the advanced version LTE-A thereof. LTE (Long Term Evolution), marketed as 4G LTE and 5G NR (new radio), is a standard for wireless communication of high-speed data for mobile phones and data terminals. 5G NR is a 3GPP terminology.

FIG. 1 shows a schematic diagram illustrating a radio communication network 100 according to the disclosure. The radio communication network 100 includes a network orchestration entity 130, a radio scheduler 140, a monitoring entity 120 and a controller 110.

The network orchestration entity 130 orchestrates 139 a plurality of network resources 134, 135, 136, 137 to set up at least one logical network 131 of a plurality of logical networks 131, 132, 133 based on a logical network specific service level agreement SLA 138. The radio scheduler 140 schedules 141 radio resources of the at least one logical network 131 based on a scheduling strategy 142. The monitoring entity 120 monitors 122 performance information 121 from the at least one logical network 131. The controller 110 is configured: to determine an SLA metric 111 for the at least one logical network 131 based on the monitored performance information 121 from the at least one logical network 131, to detect a threshold violation 112 of the SLA metric 111 with respect to a set of thresholds 113 associated with the at least one logical network 131, and to adjust 114 the scheduling strategy 142 based on the detected threshold violation 112.

The radio scheduler 140 can be implemented as an entity arranged external to the logical network 131 as shown in FIG. 1. Alternatively, the radio scheduler 140 can be arranged inside the logical network 131, for example collocated with or arranged nearby to one of the network resources 134, 135, 136, 137 of the logical network 131, e.g. as described below with respect to FIG. 2.

The network orchestration entity 130 may orchestrate 139 network resources 134, 135, 136, 137 and radio resources to set up the logical network 131. Radio resources may be for example time-frequency resources for transmission over an air interface. There may be different Radio Access Technologies (RATs) within one logical network 131. Network resources may be Servers, Routers, Gateways and other network infrastructure, e.g. as described below with respect to FIGS. 5 and 6.

The scheduling strategy 142 may be based on applying a set of weights to the radio resources of the at least one logical network 131. The controller 110 may adjust the scheduling strategy 142 by adjusting 114 the set of weights. The controller 110 may increase the set of weights applied to the radio resources of the at least one logical network 131 based on a first detected threshold violation 303, e.g. an event when the SLA metric 302 (Slice 2) falls below the first threshold 312 (Slice 2) for the first time as exemplary depicted for Slice 2 in FIG. 3. The controller 110 may further increase the set of weights applied to the radio resources of the at least one logical network 131 based on a second detected threshold violation 304, e.g. an event when the SLA metric 302 (Slice 2) falls below the second threshold 322 (Slice 2) for the first time as exemplary depicted for Slice 2 in FIG. 3. When increasing the weights, a higher amount of radio resources can be allocated resulting in a better service quality and thus a higher value for the SLA metric 315 as can be seen from FIG. 3 described below.

The scheduling strategy 142 may be implemented in the radio scheduler 140, e.g. as a table or as an algorithm. Alternatively, the scheduling strategy may be implemented in a database to which the radio scheduler 140 has direct access or indirect access via the controller 110 and/or the network orchestration entity 130. For example, the scheduling strategy 142 may be implemented together with the SLA 138 within a database 207 of the network operator, e.g. as described below with respect to FIG. 2.

Figure 3:
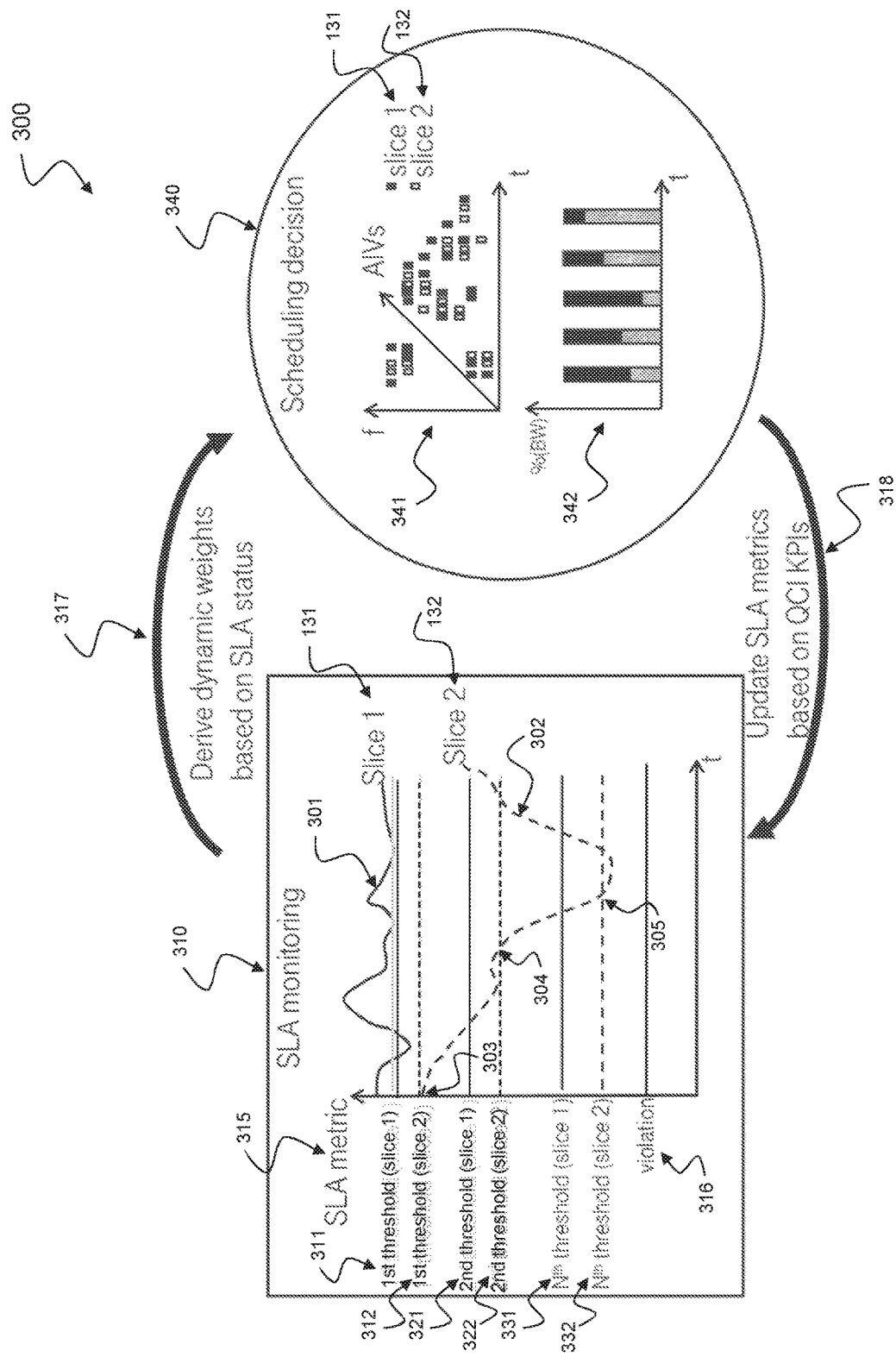
FIG. 3 shows a schematic diagram illustrating multi threshold based SLA monitoring 300 according to the disclosure.

The contexts of thresholds 311, 321, 331 of the set of thresholds 113 associated with the at least one logical network 131 may be prioritized. I.e. when the SLA metric 302 (Slice 2) falls below the second threshold 322 (Slice 2) a priorization to allocate radio resources can be higher than a priorization when the SLA metric 302 (Slice 2) falls below the first threshold 312 (Slice 2), as the first situation is less critical for the service level agreement than the second situation. When a violation 316 is detected as shown in FIG. 3, the priority to allocate radio resources may be the highest.

The controller 110 may indicate the radio scheduler 140 switching a scheduling strategy 142 for scheduling the radio resources based on detecting a specific number of threshold violations 303, 304, 305 or based on detecting a threshold violation of a specific threshold of the set of thresholds 113. A priorization of a context (e.g. radio resource allocation with respect to throughput, delay, and robustness) of the specific threshold may be set higher than a priorization of a context of the other thresholds.

The radio scheduler 140 may switch the scheduling strategy 142 for scheduling the radio resources responsive to the indication received from the controller 110. The controller 110 may indicate a detection of a specific number of threshold violations 303, 304, 305 or a detection of a threshold violation of a specific threshold of the set of thresholds 113 to the network orchestration entity 130. The network orchestration entity 130 may re-orchestrate 139 the plurality of network resources 134, 135, 136, 137 responsive to the indication received from the controller 110. A multi-escalation strategy may be applied by the network orchestration entity 130 for re-orchestrating 139 the network resources 134, 135, 136, 137, e.g. as described below with respect to FIG. 4.

The controller 110 may adjust 114 the scheduling strategy 142 according to a prioritization of data flows transported by the at least one logical network 131. For example, the controller 110 may check the header of IP data traffic to read the data type or other useful information about the data traffic. Depending on this data type the data flow may obtain more radio resources, e.g. if the data flow is assigned to a high priority or the data flow may obtain a less amount of radio resources, e.g. if the data flow is assigned to a low priority. The controller 110 may for example adjust the scheduling strategy 142 based on adjusting a QCI class of the data flows and/or based on a deviation of a monitored Key Performance Indicator (KPI) from a KPI determined by the SLA 138 of the at least one logical network 131. Such KPI may be monitored by the monitoring entity 120.

Distances between the thresholds 311, 321, 331 of the set of thresholds associated with the at least one logical network 131 may be correlated. I.e. the correlation is related to all thresholds or at least a subset of the thresholds within one logical network. For example, the thresholds may have the same distance with respect to each other, or the distance between thresholds may increase or decrease from threshold to threshold. The controller 110 may normalize a first SLA metric determined for a first logical network 131 of the plurality of logical networks with respect to a second SLA metric determined for a second logical network 132 of the plurality of logical networks according to a common evaluation strategy. This means that a threshold for a first logical network 131 has the same effect or quality than a threshold for a second logical network 132, i.e. both logical networks are comparable based on the common evaluation strategy.

Alternatively or additionally, distances between thresholds 311, 321, 331 associated with the first logical network 131 and corresponding thresholds 312, 322, 332 associated with the second logical network 132 may be correlated. I.e. the correlation is between thresholds or at least a subset of thresholds belonging to different logical networks. For example, the thresholds of one logical network and another logical network may have the same distance with respect to each other, or the distance may increase or decrease from threshold to threshold.

The thresholds may be set-up by the network orchestration entity 130, e.g. at set-up of a logical network 131 or when the logical network 131 is re-orchestrated. For example at start-up the network operator knows the logical networks and the associated thresholds to be set up by the network orchestration entity 130. During operation of these logical networks, there may be demand for set up of an additional logical network with associated thresholds. Then, the network orchestration entity 130 can set up the additional logical network and provide the respective thresholds to the controller 110. The thresholds provided by the network orchestration entity 130 may be usually raw thresholds which are not normalized with thresholds of other logical networks as during the operation of the system different demands for adding or removing slices (logical networks) with associated thresholds may occur. A comparison or normalization of these thresholds can then be performed (at run-time) by the controller 110 or optionally by the network orchestration entity 130. Note, that a normalization of the SLA metrics can be performed or alternatively a normalization of the thresholds.

The radio communication network 100 may include a network 500, 600 according to a fifth generation (5G) or according to a further generation, e.g. as described below with respect to FIGS. 5 and 6. The at least one logical network 131 may be a network slice 610b, 611b, 612b of the 5G network 500, 600 communicating with a physical layer 505 of the 5G network 500, 600, e.g. as described below with respect to FIGS. 5 and 6.

With respect to the radio communication network 100 described above, a method for operating the radio communication network 100 can include the following blocks: orchestrating, by a network orchestration entity 130, a plurality of network resources to set up at least one logical network 131 of a plurality of logical networks based on a logical network specific service level agreement (SLA) 138; scheduling, by a radio scheduler 140, radio resources of the at least one logical network 131 based on a scheduling strategy; monitoring, by a monitoring entity 120, performance information from the at least one logical network 131; and determining, by a controller 110, an SLA metric 111 for the at least one logical network 131 based on the monitored performance information from the at least one logical network 131, to detect a threshold violation 112 of the SLA metric 111 with respect to a set of thresholds 113 associated with the at least one logical network 131, and to adjust, by the controller 110, the scheduling strategy based on the detected threshold violation 112.

Figure 2:
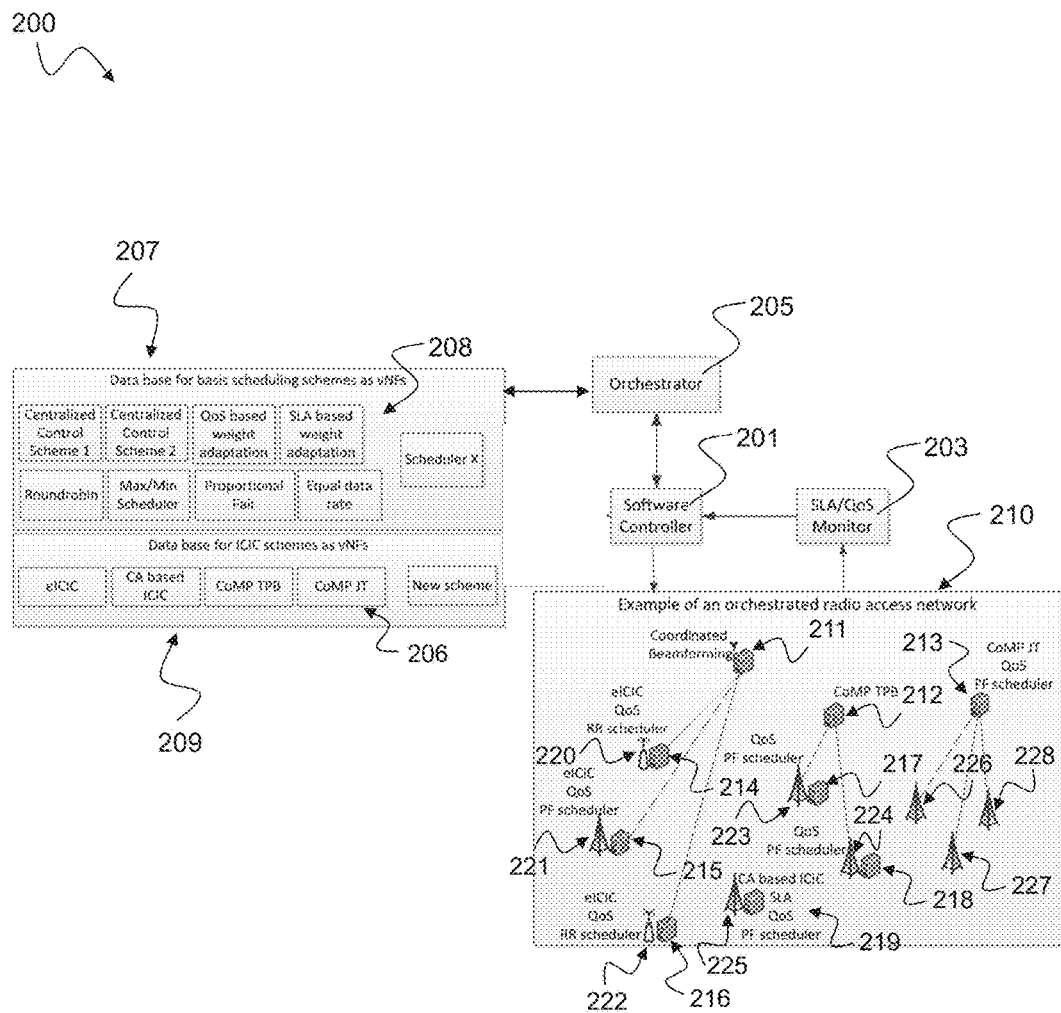
FIG. 2 shows a schematic diagram illustrating a radio communication network 200 according to the disclosure.

FIG. 2 shows a schematic diagram illustrating a radio communication network 200 according to the disclosure. The radio communication network 200 is a specific implementation of the radio communication network 100 described above with respect to FIG. 1.

The network orchestration entity, also referred to as Orchestrator 205 orchestrates 139 a plurality of network resources as exemplary shown within in the depicted orchestrated radio access network 210 to set up one or more logical networks based on a logical network specific service level agreement SLA. For example a first logical network may include components 211, 220, 214, 221, 215, 222, 216. A second logical network may include components 225, 219. A third logical network may include components 212, 223, 217, 224, 218. A fourth logical network may include components 213, 226, 227, 228, etc. The radio scheduler, e.g. 211, 219, 212, 213 schedules radio resources of the respective logical network based on a scheduling strategy or scheduling scheme 208. The monitoring entity, also referred to as SLA/QoS monitor 203 monitors performance information from the respective logical network. The controller, also referred to as software controller 201 is configured: to determine an SLA metric for the respective logical network based on the monitored performance information of the corresponding logical network, to detect a threshold violation of the SLA metric with respect to a set of thresholds associated with the corresponding logical network, e.g. as described below with respect to FIG. 3, and to adjust the scheduling strategy based on the detected threshold violation.

As shown in FIG. 2, the scheduling strategy 142 described above with respect to FIG. 1, may be implemented in a database 207 with all kinds of scheduling schemes 208 which can be flexibly combined or exchanged at the base station when necessary based on SDN and NFV principles.

During some situations in the network 200 it makes sense to create temporarily, e.g. a BS cluster where a proportional fair (PF) based, QoS aware, joint transmission coordinated multi point (JT CoMP) flavored scheduler is applied (right cluster within the radio access network 210 with elements 213, 226, 227, 228). Such a cluster can be set up by the Orchestrator 205 as a first logical network or a first slice, e.g. a first logical network 131 as described above with respect to FIG. 1. While for another area in the network 210 a smaller cluster is created where a PF and QoS flavored scheduler is applied at each BS of the cluster. Such a cluster can be set up by the Orchestrator 205 as a second logical network or a second slice, e.g. a second logical network 132 as described above with respect to FIG. 1. In addition a centralized entity 212 which performs CoMP Transmission point blanking (TPB) may be formed (middle cluster within the network 210 of FIG. 2 including elements 212, 217, 218, 223, 224) satisfying the QoS of each specific user. Such a cluster can be set up by the Orchestrator 205 as a third logical network or a third slice, e.g. a third logical network 133 as described above with respect to FIG. 1. Another base station 225 (with collocated radio scheduler 218) schedules radio resources for its own based on a combination of a PF, SLA and QoS aware with carrier aggregation based ICIC scheme. Such a cluster can be set up by the Orchestrator 205 as a fourth logical network or a fourth slice, e.g. a further logical network as described above with respect to FIG. 1. The system gains from the flexibility to react on locally dynamic changes in the network (e.g. a lot of cell edge UEs got active and centralized scheduling should be applied to improve cell edge performance without decreasing the spectral efficiency of the system).

A logical network or slice may also be set up as a combination of different clusters with the applied radio resource management (RRM) methods. Multiple logical networks or slices may share one (or more) cluster, for example, a first cluster may include base stations BS1 and BS2 while a second cluster may include base station BS3. Then BS1 may be used for slice1, BS3 may be used for slice2 and BS2 may be used for both, slice1 and slice2.

To adapt the scheduling scheme in a dynamic way as described above, a centralized software controller 201 as well as a live monitoring entity 203 is provided which observes the current performance at each individual BS or radio cell. The monitor 203 provides frequently the status and the controller 201 derives a critical situation (e.g. SLA of a network slice or QoS of a specific flow cannot be fulfilled or thresholds violated as described above with respect to FIG. 1 or below with respect to FIG. 3), as an alternative. Then, the controlling entity 201 takes a decision what kind of scheduling algorithms and metrics should be used at the problematic area within the network 210. For instance, a lot of cell edge users are active and the cell edge performance of a certain BS cluster needs to be increased, then it may make sense to load temporarily a centralized scheduler which interacts with the BS local proportional fair and QoS aware flavored scheduler. The controller 201 loads an individualized scheduler for that specific issue to improve the performance of that part of the network 210. The controller 201 can access the database 207 via the orchestrator 205 or in alternative implementation (not shown in FIG. 2), the controller 201 can directly access the database 207 without the orchestrator 205.

The radio communication network 200 shown in FIG. 2 includes a plurality of radio cells 221, 222, 223, 224, 225, 226, 227, 228, for example base stations or WiFi Hotspots or other small cells, a plurality of radio schedulers 214, 215, 216, 217, 219, 224 and other network schedulers 211, 212, 213, a monitor 203, e.g. for monitoring service level agreements and/or QoS and a controller 201, e.g. a software controller. The plurality of radio cells 221, 222, 223, 224, 225, 226, 227, 228, the plurality of radio schedulers 214, 215, 216, 217, 219, 224 and other network schedulers 211, 212, 213 are arranged in an orchestrated radio access network 210 that may be controlled by the software controller 201 and monitored by the SLA/QoS monitor 203. The radio communication network 200 further includes an orchestrator 205 for setting-up or initializing the radio access network 210. The radio communication network 200 further includes a database 207 for storing basis scheduling schemes 208 and a database 209 for storing ICIC schemes, e.g. as virtual network functions.

The radio cells 221, 222, 223, 224, 225, 226, 227, 228 may transmit data flows to corresponding user equipments (not shown in FIG. 2) by using radio resources, e.g. time-frequency resources scheduled to the radio cells by radio schedulers 214, 215, 216, 217, 224, 213 for transmission of the data flows, e.g. as described above with respect to FIG. 1.

The radio schedulers 214, 215, 216, 217, 219, 224 may be collocated to the corresponding radio cells 221, 222, 223, 224, 225, 226, 227, 228 and may schedule radio resources, e.g. time-frequency space resources to the corresponding radio cells according to a respective scheduling strategy 142, e.g. as described above with respect to FIG. 1.

The SLA/QoS monitor 203 monitors performance information from the radio cells 221, 222, 223, 224, 225, 226, 227, 228 of the radio access network 210 and the controller 201 adjusts/adapts the respective scheduling strategy 142 of the corresponding radio scheduler 214, 215, 216, 217, 219, 224 based on the monitored performance information as described above with respect to FIG. 1.

The radio cells 221, 222, 223, 224, 225, 226, 227, 228 and radio schedulers 214, 215, 216, 217, 219, 224 of the radio access network 210 may be grouped in different clusters as shown in FIG. 2. For example, a first cluster (or first logical network) may include a coordinated beamforming network entity 211 coordinating an eICIC QoS round-robin (RR) radio scheduler 214 collocated with a small radio cell 220, an eICIC QoS proportional fair (PF) radio scheduler 215 collocated with a base station 221 and an eICIC QoS round robin radio scheduler 216 collocated with a small radio cell 222.

A second cluster (or second logical network) may include a coordinated multipoint (CoMP) TPS network entity 212 coordinating a QoS PF radio scheduler 217 collocated with a base station 223 and a QoS PF radio scheduler 218 collocated with a base station 224.

A third cluster (or third logical network) may include a service level agreement (SLA) QoS PF radio scheduler 219 collocated with a base station 225.

A fourth cluster (or fourth logical network) may include a stand-alone CoMP joint transmission (JT) QoS PF radio scheduler 213 scheduling three base stations 226, 227, 228.

The orchestrator 205 may load scheduling metrics from the plurality of scheduling metrics 208 stored in the database 207, e.g. based on a request for setting up a network slice, e.g. a network slice 510b, 511b, 512b as described below with respect to FIGS. 5 and 6. The physical infrastructure may form the radio access network 210 to bear one or more logical networks (slices) which may include one or more clusters as described above. Each or some cluster may be divided between different logical networks such that resources of the cluster are allocated to these logical networks.

The orchestrator 205 may assign different radio schedulers 214, 215, 216, 217, 219, 224 to different groups of radio cells 220, 221, 222, 223, 224, 225, 226, 227, 228 according to their specific scheduling strategy requirements. The orchestrator 205 may for example configure the scheduling metrics 208 based on a service function chain template which defines multiple combinations of metrics and ICIC schemes 206.

The software controller 201 may select one or a combination of the basic scheduling schemes 208 and/or one or a combination of the ICIC schemes 206 via the orchestrator 205 from the database 207, 209 for adjusting a respective radio scheduler schedulers 214, 215, 216, 217, 219, 224. The basic scheduling schemes 208 may include for example the schemes round robin, max/min, proportional fair, equal data rate, etc. The ICIC schemes 206 may for example include the schemes enhanced inter-cell interference coordination (eICIC), carrier aggregation (CA) based ICIC, coordinated multi-point (CoMP) transmission point blanking (TPB), CoMP joint transmission (JT), coordinated beamforming, centralized scheduling, etc. The scheduling may be based on a quality-of-service (QoS) class and/or a service level agreement (SLA). The SLA/QoS monitor 203 may for example monitor performance information from the radio cells 220, 221, 222, 223, 224, 225, 226, 227, 228, such as: QoS, SLA for a logical network 210, a traffic demand for a UE and channel conditions of radio links to the UEs.

The software controller 201 may adjust the scheduling strategies of the radio schedulers 214, 215, 216, 217, 219, 224 per radio cell or per radio cell cluster. The software controller 201 may activate or deactivate combinations of scheduling metrics (208). A radio scheduler (or the radio schedulers) of a specific logical network (e.g. network 210) may apply a first scheduling strategy to a cluster of radio cells 220, 221, 222 located in a first area of the radio communication network 200, and a second scheduling strategy to a cluster of base stations 223, 224 located in a second area of the radio communication network 200. The scheduling strategy may be based on a scheduling metric.

The radio communication network 200 may include a network 500, 600 according to a fifth generation (5G) or according to a further generation, e.g. as described below with respect to FIGS. 5 and 6. A part of the radio schedulers 214, 215, 216, 217, 219, 224 or all of them may be implemented as a virtual network function 622 of an activation layer 504 of the 5G network 500, 600 communicating with a physical layer 505 of the 5G network 500, 600, e.g. as described below with respect to FIGS. 5 and 6.

The radio schedulers may schedule radio resources of a first network slice 610b of the 5G network 500, 600 and radio resources of a second network slice 611b of the 5G network 500, 600 according to a common scheduling metric which may be designed according to an optimization criterion to best fit requirements of the first network slice 610b and the second network slice 611b concurrently.

FIG. 3 shows a schematic diagram illustrating multi threshold based SLA monitoring 300 according to the disclosure. The described SLA monitoring 300 can be implemented by the radio communication network 100 described above with respect to FIG. 1 or the radio communication network 200 described above with respect to FIG. 2.

FIG. 3 shows an SLA metric 315 obtained by SLA monitoring of a monitoring entity, e.g. a monitoring entity 120 as described above with respect to FIG. 1 or an SLA/QoS monitor 203 as described above with respect to FIG. 2. The SLA metric 312 includes an SLA metric 301 of a first slice, e.g. a first logical network 131 as described above with respect to FIG. 1, and an SLA metric 302 of a second slice 132, e.g. a second logical network 132 as described above with respect to FIG. 1. A plurality of thresholds is shown relating to the first slice 131 and the second slice 132. A first threshold for slice 1 is denoted as 311, a second threshold for slice 1 is denoted as 321 and an Nth threshold for slice 1 is denoted as 331. A first threshold for slice 2 is denoted as 312, a second threshold for slice 2 is denoted as 322 and an Nth threshold for slice 2 is denoted as 332. A threshold indicating an overall violation is denoted as 316.

Based on the SLA status dynamic weights can be derived 317 which can be used for the scheduling decision 340. The scheduling decision 340 may depend on frequency-time resources 341 of air interface variants (AIV) for the first slice 131 and the second slice 132. The scheduling decision 340 may further depend on an available bandwidth 342 for the first slice 131 and the second slice 132. Quality Class Indicator Key Performance Indicators (QCI KPIs) may be determined based on which the SLA metrics may be updated 318.

In the following, one exemplary implementation of multi threshold based SLA monitoring 300 is described. In this implementation, referred to as Example 1, two slices are running on the same physical infrastructure. An SLA metric 301, 302 for each slice 131, 132 is calculated and must be normalized to compare slice specific SLAs. Multiple thresholds 311, 312, 321, 322, 331, 332 are defined which are intra and inter slice correlated to derive weights for scheduling decisions in a more precise way (higher granularity/resolution). Each threshold defines a region of the normalized SLA metric. FIG. 3 shows the principle approach having multiple thresholds. On the y-axis the normalized SLA value is defined while on x-axis the time is shown. Dependent on the slice specific SLA the thresholds 311, 312, 321, 322, 331, 332 are set to define more or less critical regions until the SLA is violated 316. For instance slice one 131 has a very relaxed situation regarding a possible SLA violation 316. In the first time period the SLA metric 301 exceeds the first defined threshold 311. When the first threshold 311 is exceeded a slightly higher prioritization to allocate radio resources for slice 1 is derived. Therefore a dynamic weight is set to ease the situation again. For slice one it was possible to influence the scheduling metric positive by slightly higher prioritization in all 3 cases where the first threshold 311 was exceeded. The behavior of the SLA metric 302 regarding slice 2 behaves a bit different and might be dependent on the scheduling decision taken for slice 1. A slightly increasing prioritization in the first step didn't have a positive influence and could not prevent the SLA metric 302 exceeding the second threshold 322, as well. After further increasing the priority more aggressively the situation relaxes slightly until the metric 302 falls sharply below the Nth threshold 332.

The prioritization is then heavily increased to prevent an SLA violation 316 by all means. It can be observed, during the time period the SLA metric 302 of slice 2 is in the critical region of the Nth threshold 332, the SLA metric 301 of slice 1 slightly decreased because of interdependencies of the scheduling decision. As indicated on the right side of FIG. 3 slice 2 allocates more and more of the system bandwidth due to higher prioritization. After aggressively prioritizing the traffic of slice 2 for a while, a positive influence can be observed, while the metric 302 recovers until the second threshold 322 is reached. Then the prioritization of slice 2 is decreased again. Even with the decreased prioritization ongoing recovery is observed when the metric 302 rises in the direction of the first threshold 312 again. It is worth mentioning that the derived weights to prioritize the slices based on the individual metric is dependent on the status of the other slices which are operated within the system and share physical radio resources.

In the following, another exemplary implementation of multi threshold based SLA monitoring 300 is described. In this implementation, referred to as Example 2, Slice 1 is orchestrated for ultra-reliable communication services and Slice 2 is orchestrated for broadband everywhere. In this implementation, the following SLAs are defined:

For Slice 1: 99.999% of all data flows need to be successfully transmitted; and a single data flow needs to have a maximum packet delay of 10 ms within 95% of the cases.

For Slice 2: Guaranteed bit rate of 50 Mbps everywhere in 97.5% of the cases; and a single data flow has a maximum packet delay of 50 ms within 90% of the cases.

One data flow per slice is currently active and is routed based on e.g. IPv6 to the same mobile access entity (e.g. eNodeB). Each data flow has a certain Quality channel indicator (QCI) class marked within the IPv6 header extension field (In general 8 byte available): Data flow A (of slice 1) has non-GBR with max delay of 10 ms; Data flow B (of slice 2) has GBR with max delay of 50 ms.

SLA monitoring entity adds, e.g., two additional information to the IPv6 header: 1) SLA indicator to let the access node know which SLA has to be fulfilled; 2) SLA status indicators to let the access node know if SLA might be violated.

The SLA status indicators can be deltas to the defined thresholds, which indicate the degree of freedom of how to handle the data flow due to the SLA and its current instantaneous status. The smaller the delta of the SLA status indicator, the higher will be the weighting factor of the considered data flow.

Based on the additional information about the SLA (status) the access nodes' (eNodeB) radio scheduler can adapt dynamically the weighting factors to prioritize the transmission of each data flow. Influencing factors are: 1) The QCI classes of the data flow; 2) e.g. the delta of the instantaneous status of the KPIs of the SLAs of the network slices compared to the SLA.

Requirements to the scheduler of data flow A are for Alternative 1: Transmission would use a lower Modulation and Coding Scheme (MCS) to make sure to be successful in transmission and avoid retransmission which result in higher latency, this results in a lower spectral efficiency so more radio resources are used "uneffıcent" but robust. Requirements are for Alternative 2: In case of dual or multi connectivity redundant transmission over more than one access node. Requirements to the scheduler of data flow B are: Transmission needs a lot of resources because 50 Mbps everywhere is guaranteed (especially at cell edge where only low MCS might be useful).

In the following reference is made to an LTE like radio frame where the radio scheduler can allocate radio resources on TTI (1 ms) level. Usually the scheduler would serve data flow B at first because of the GBR QCI class. Due to the unpredictable upcoming traffic situation GBR needs to be fulfilled as fast as possible. However Data Flow A needs to be transmitted successful with a probability of 99.999%. Based on this very challenging SLA requirement the radio scheduler needs to change the priority which data to map on the physical resources to transmit.

The following can be summarized: QCI of data flow B results in higher weight for data flow B than for data flow A. But slice specific SLA status gives extra information which will result in a contradicting weight in the end. Worst case: Data flow B is discarded or not immediately scheduled (may be slice status gives information that in 99% of the cases it was successful and can be discarded) due to data flow A (flow of the uMTC slice A) which cannot be discarded at all (99.999%). In critical cases in front of an SLA violation the SLA can already be influenced by Admission Control (AC) and Allocation and Retention Priority (ARP). After scheduling decision is taken and applied the radio scheduler feeds back what happened based on QCI KPIs (data rate, BER, latency). Then the SLA metric are updated by mapping QCI specific KPIs the SLA metric.

Figure 4:
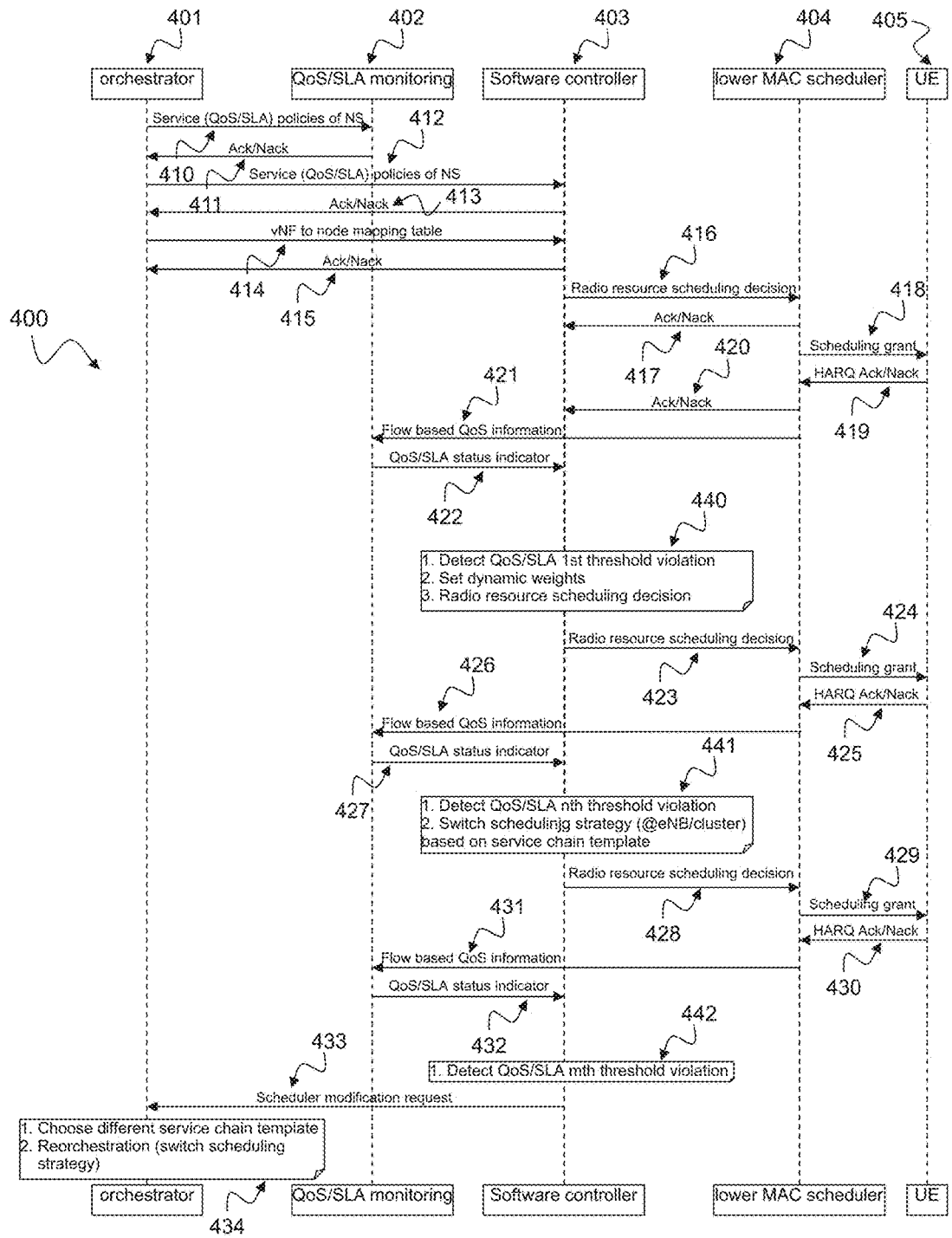
FIG. 4 shows a message sequence diagram 400 illustrating messaging between the entities of a radio communication network according to the disclosure.

FIG. 4 shows a message sequence diagram 400 illustrating messaging between the entities of a radio communication network according to the disclosure, e.g. a radio communication network 100 or 200 as described above with respect to FIGS. 1 and 2. A possible function split between an orchestrator 401 that may correspond to the orchestrator 205 depicted in FIG. 2 or the network orchestration entity 130 depicted in FIG. 1, a QoS/SLA monitoring entity 402 that may correspond to the SLA/QoS monitor 203 depicted in FIG. 2 or to the monitoring entity 120 depicted in FIG. 1, a software controller 403 that may correspond to the software controller 201 depicted in FIG. 2 or to the controller 110 depicted in FIG. 1, a lower MAC scheduler 404 that may correspond to a respective radio scheduler 214, 215, 216, 217, 218, 219 depicted in FIG. 2 or to the radio scheduler 140 depicted in FIG. 1 and a UE 405, e.g. a mobile device communicating in the radio communication networks 100 or 200 of FIGS. 1 and 2 is shown in FIG. 4. The radio scheduling functions may be implemented at a lower MAC layer which gets information from PHY layer.

The messages as described in the following are examples, other implementations are possible as well. In the example of FIG. 4, the orchestrator 401 transmits a "Service (QoS/SLA) policies of NS" message 410 to QoS/SLA monitoring entity 402 that answers with an "Ack or Nack" message 411. Then, the orchestrator 401 transmits a "Service (QoS/SLA) policies of NS" message 412 to software controller 403 that answers with an "Ack or Nack" message 413. Then, the orchestrator 401 transmits a "vNF to node mapping table" message 414 to software controller 403 that answers with an "Ack or Nack" message 415. This "vNF to node mapping table" message 414 may indicate a virtual node function mapping as determined by the Orchestrator 401 to the software controller 403.

The software controller 403 transmits a "Radio resource scheduling decision" message 416 to the lower MAC scheduler 404 to indicate a scheduling of radio resources to lower MAC scheduler 404 that answers with an "Ack or Nack" message 417. Then, the lower MAC scheduler 404 transmits a "scheduling grant" message 418 to the UE 405 to grant the UE 405 the scheduling of radio resources. The UE 405 answers with an "HARQ Ack or Nack" message 419. Then, the lower MAC scheduler 404 transmits an "Ack/Nack" message 420 to the software controller 403 and transmits a "Flow based QoS information" message 421 to the QoS/SLA monitoring entity 402 to indicate monitored quality of service information and/or monitored SLA to the QoS/SLA monitoring entity 402 upon which message 421 the QoS/SLA monitoring entity 402 answers with a "QoS/SLA status indicator" message 422 to indicate the status of QoS/SLA monitoring to the software controller 403. This status may indicate for example a threshold violation 316 as depicted in FIG. 3 or an event that the SLA metrics 301, 302 for first slice 131 and second slice 132 and other slices fall below one of the thresholds 311, 312, 321, 322, 331, 332 as described above with respect to FIG. 3. Based on the received information, e.g. the status information and/or the data measured by the monitoring entity 402, the software controller 403 detects 440 a first QoS/SLA threshold violation (1.), e.g. a threshold violation 316 as depicted in FIG. 3; the software controller 403 sets dynamic weights (2.) or more general speaking, adjusts the scheduling strategy 142 as described above with respect to FIG. 1; and determines a radio resource scheduling decision (3.). Based on this decision, a "radio resource scheduling decision" message 423 is sent to the lower MAC scheduler 404 to inform the lower MAC scheduler 404 about this decision. The lower MAC scheduler 404 forwards a "Scheduling grant" message 424 to the UE 405 to grant the new scheduling decision to the UE. The UE 405 answers with a "HARQ Ack/Nack" message 425.

The lower MAC scheduler 404 transmits a "Flow based QoS information" message 426 to the QoS/SLA monitoring entity 402 to indicate monitored quality of service information and/or monitored SLA to the QoS/SLA monitoring entity 402 upon which message 426 the QoS/SLA monitoring entity 402 answers to the software controller 403 with a "QoS/SLA status indicator" message 427 to indicate the status of QoS/SLA monitoring to the software controller 403 as described above.

Based on the received information, e.g. the status information and/or the data measured by the monitoring entity 402, the software controller 403 detects 441 a further, e.g. an nth QoS/SLA threshold violation (1.), e.g. a threshold violation 316 as depicted in FIG. 3; the software controller 403 switches the scheduling strategy (2.), e.g. at eNB and/or cluster as described above with respect to FIG. 2, based on service chain templates and determines a radio resource scheduling decision. Based on this decision, a "radio resource scheduling decision" message 428 is sent to the lower MAC scheduler 404 which forwards a "Scheduling grant" message 429 to the UE 405. The UE 405 answers with a "HARQ Ack/Nack" message 430, as described above.

The lower MAC scheduler 404 transmits a "Flow based QoS information" message 431 to the QoS/SLA monitoring entity 402 to indicate monitored quality of service information and/or monitored SLA to the QoS/SLA monitoring entity 402 upon which message 431 the QoS/SLA monitoring entity 402 answers to the software controller 403 with a "QoS/SLA status indicator" message 432 to indicate the status of QoS/SLA monitoring to the software controller 403 as described above.

Based on the received information, e.g. the status information and/or the data measured by the monitoring entity 402, the software controller 403 detects 442 a further, e.g. an mth QoS/SLA threshold violation (1.), e.g. a threshold violation 316 as depicted in FIG. 3. In this example after the mth QoS/SLA threshold violation, an escalation of the threshold violation is indicated to the Orchestrator 401 by a "Scheduler modification request" message 433 that is sent to the orchestrator 401 to indicate the orchestrator 401 a requirement for changing or modifying the scheduling. Upon this message 433 the orchestrator 401 chooses a different service function chain template (1.) and performs reorchestration (2.) by switching the scheduling strategy 434.

The message sequence diagram 400 represents a possible implementation of a method for scheduling radio resources in a radio communication network as described above with respect to FIG. 1.

Figure 5:
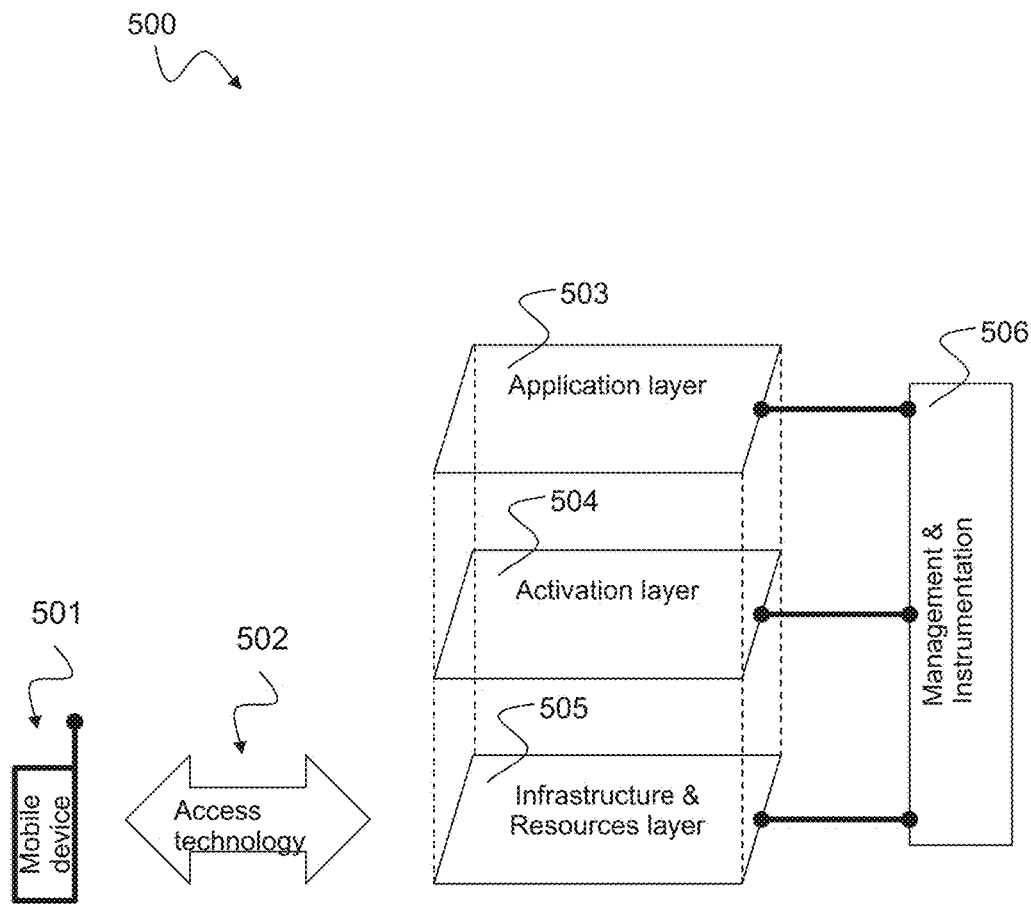
FIG. 5 shows a schematic diagram illustrating an exemplary 5G system architecture 500 for which radio resources can be scheduled by a radio scheduler according to the disclosure.

FIG. 5 shows a schematic diagram illustrating an exemplary 5G system architecture 500 which radio resources can be scheduled by a radio scheduler according to the disclosure.

The 5G system architecture 500 includes an area with 5G communication terminals 501 which are connected via different access technologies 502 to a multilayered communication structure. This multilayered communication structure includes an Infrastructure & Resources layer 505, an activation layer 504 and an application layer 503 which are managed by a management & Instrumentation plane 506.

The Infrastructure & Resources layer 505 includes the physical resources of a converged network structure of fixed and mobile network components ("Fixed-Mobile Convergence") with access point, cloud nodes (consisting of processing and storage node), 5G devices such as mobile phones, portable devices, CPEs, machine communication modules and other network nodes and related links. 5G devices can include multiple and configurable capabilities and act, for example, as a relay or hub or can operate depending on the particular context as a computer or memory resource. These resources are provided to the higher layers 504, 503 and the management & Instrumentation layer 506 via corresponding APIs (application program interfaces). Monitoring the performance and the configurations are inherent to such APIs.

The activation layer 504 includes a library of functions that are needed within a converged network in the form of blocks of a modular architecture. These include functions that are implemented in software modules that can be retrieved from a storage location of the desired location, and a set of configuration parameters for specific parts of the network, for example, the radio access. These features and capabilities can be accessed on demand by the management & Instrumentation layer 506 by using the provided APIs. Certain functions may exist in multiple variants, for example, different implementations of the same functionality having different performance or characteristic.

The application layer 503 includes specific applications and services of the network operator, the company, the vertical operator or by third parties who use the 5G network. The interface to the management & Instrumentation layer 506 allows to use certain dedicated network slices for an application, or to assign an application to an existing network slice.

The management & Instrumentation layer 506 is the contact point for the required use cases (use cases, business models) to put into actual network functions and slices. It defines the network slices for a given application scenario, concatenates the relevant modular network functions, assigns the relevant performance configurations and maps all to the resources of the infrastructure & resources layer 505. The management & Instrumentation layer 506 also manages the scaling of the capacity of these functions as well as their geographical distribution. In certain applications, the management & Instrumentation layer 506 may also have skills that allow third parties to produce and manage their own network slices by the use of APIs. Because of the numerous tasks of the management & Instrumentation layer 506, these are not a monolithic block of functionality but rather a collection of modular functions, integrating progresses that have been achieved in different network domains, such as NFV (network function virtualization), SDN (software-defined networking) or SON (self-organizing networks). The management & Instrumentation Layer 506 utilizes data assisted intelligence to optimize all aspects of service assembly and deployment.

The radio scheduler 140 described above with respect to FIG. 1 may be used to schedule radio and/or network resources of the communication network 500. The radio scheduler 140 may be a part of the network 500, e.g. as shown in FIG. 2 or may be arranged outside the network 500, e.g. as shown in FIG. 1. The radio scheduler 140 may for example be implemented in the activation layer 504, e.g. as a virtual network function 622 in a network slice or alternatively located at the management & Instrumentation level 506. Alternatively, each network slice or slice instance may include a radio scheduler 140. Network entities requesting resources of the communication network 500 may for example be network nodes of the infrastructure and resources layer 505, or network nodes of the activation layer 504 or network slices or slice instances of the application layer 503. Network entities requesting resources of the communication network 500 may also be mobile devices 501, base stations, base station controllers, radio network controllers etc. requesting resources for initiating a communication channel over the communication network 500.

The network orchestration entity 130 depicted in FIG. 1 may for example be implemented in the management & Instrumentation layer or level 506. The monitoring entity 120 and the controller 110 may be implemented for example on the application layer 503, e.g. per network slice or as single entities for all network slices. Alternatively, the monitoring entity 120 and the controller 110 may be implemented for example in the management & Instrumentation layer or level 506.

The 5G network 500 increases the efficiency of communication and provides in particular a higher data throughput, lower latency, particularly high reliability, a much higher connection density and a larger mobility area. The 5G network 500 increases the operational flexibility and provides tailored features and functions while saving network resources. This increased performance is accompanied by the ability to control highly heterogeneous environments and the ability to secure trust, identity and privacy of users.

Figure 6:
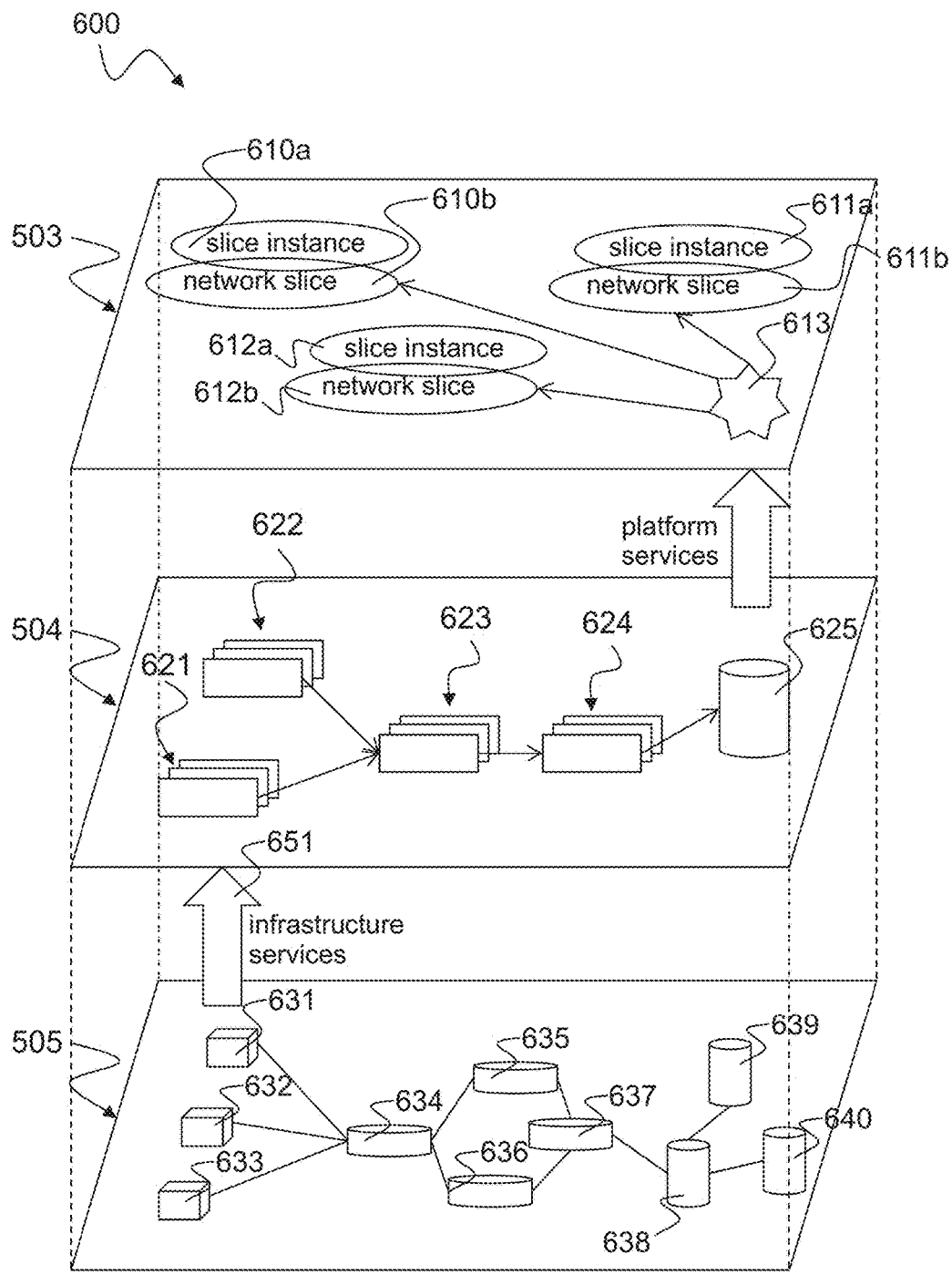
FIG. 6 shows a schematic diagram illustrating an exemplary 5G communication network 600 including a plurality of network slices for which radio resources can be scheduled by a radio scheduler according to the disclosure.

FIG. 6 shows a schematic diagram illustrating an exemplary 5G communication network 600 including a plurality of network slices which radio resources can be scheduled by a radio scheduler according to the disclosure.

The 5G-communication network 600 includes an infrastructure & resources layer 505, an activation layer 504 and an application layer 503, as described above with respect to FIG. 5.

The Infrastructure & Resources layer 505 includes all physical assets that are associated with a network operator, i.e., locations, cable, network nodes, etc. This layer 505 forms the basis for all network slices. It is structured as generic as possible without too many specialized engineering units. The Infrastructure & Resources layer 505 conceals any kind of user-specific implementation towards the upper layers, so that the remaining systems can be used optimally for different slices. Components of the infrastructure and resources layer 505 are based on hardware and software or firmware that is needed for each operation and that is provided to the overlying layers as resource objects. Objects of infrastructure & resources layer 505, for example, include virtual machines, virtual links or connections and virtual networks, for example, virtual access node 631, 632, 633, virtual network nodes 634, 635, 636, 637 and virtual computer nodes 638, 639, 640. As the term "virtual" implies, the infrastructure and resources layer 505 provides the objects in the form of an "infrastructure as a service" 651, i.e. in an abstracted, virtualized form to the next higher layer 504.

The activation layer 504 is arranged above the infrastructure & resources layer 505. It uses the objects of the infrastructure & resources layer 505 and adds additional functionality to these objects, for example in the form of (non-physical) software objects/VNFs (virtual network functions) to enable generation of any type of network slices and hence to provide a platform as a service to the next higher layer 503.

Software objects can exist in any granularity, and may include a tiny or a very large fragment of a network slice. In order to be able to allow the generation of network slices on a suitable level of abstraction in the activation layer 504 different abstract objects 621 can be combined with other abstracted objects and virtual network functions 622 to form combined objects 623, which can be converted into aggregated objects 624 which can be provided in an object library 625 to the next higher level. Thus, the complexity can be hidden behind the network slices. For example, a user can create a mobile broadband slice and define merely a KPI (Key Performance Indicator) without having to specify specific features such as individual local antenna cover, backhaul links and specific parameterization degrees. Supporting an open environment, allowing to add or delete network functions on demand, is an important skill of the activation layer 504 that supports the dynamic rearrangement of functions and connectivities in a network slice, for example, by using SFC (Service Function Chaining) or modifying software so that the functionality of a slice can be completely pre-defined and can include both approximately static software modules and dynamically adaptable software modules.

A network Slice can be regarded as software-defined entity that is based on a set of objects that define a complete network. The activation layer 504 includes all software objects that are necessary to provide the network slices and the appropriate skills to handle the objects. The activation layer 504 may be considered as a type of network operating system complemented by a network production environment. An important task of the activation layer 504 is defining the appropriate levels of abstraction. So network operators have sufficient freedom to design their network slices while the platform operator can still keep maintaining and optimizing the physical nodes. For example, the execution of everyday tasks such as adding or replacing NodeBs, etc. is supported without the intervention of the network client. The definition of suitable objects that model a complete telecommunications network, is one of the essential tasks of the activation layer 504 in developing the network slices environment.

A network slice, also known as 5G Slice, supports communication services of a certain type of connection with a particular type of handling of the C (Control) and U (User Data) layer. A 5G slice is composed of a collection of different 5G network functions and specific radio access technology (RAT) settings that are combined together for the benefit of the specific use case. Therefore, a 5G Slice spans all domains of the network, for example, software modules that run on a cloud node, specific configurations of the transport network that support a flexible location of functions, a particular radio configuration or even a particular access technology as well as a configuration of 5G devices. Not all slices contain the same features, some features that today seem to be essential for a mobile network can even not occur in some slices. The intention of the 5G Slice is to provide only the functions that are necessary for the specific use case and to avoid any other unnecessary functionalities. This flexibility provides for the widening of existing applications as well as for creating new applications. Third party devices can thus be granted permission to control certain aspects of slicing through appropriate APIs to provide such customized services.

The application layer 503 includes all generated network Slices 610b, 611b, 612b and offers these as "network as a service" to different network users, for example, different customers. This allows for the reuse of defined network slices 610b, 611b, 612b for different users, for example as a new network instance 610a, 611a, 612a. A network slice 610b, 611b, 612b, which is associated, for example, with an automotive application can also be used for applications in various other industrial applications. The slices instances 610a, 611a, 612a, generated by a first user, can for example be independent of the slices instances that were generated by a second user, although the entire network slice functionality may be the same.

By using the radio scheduler described above with respect to FIGS. 1 and 2, radio resources of the communication network 600 can be scheduled. The radio scheduler 105 may be a part of the network 600 or may be arranged outside the network 600, for example in a foreign network. The radio scheduler 140 may for example be located in a network slice 610b or slice instance 610a. Network entities requesting resources of the communication network 600 may for example be network nodes of the infrastructure and resources layer 505, or network nodes of the activation layer 504 or network slices or slice instances of the application layer 503. Network entities requesting resources of the communication network 600 may also be mobile devices, base stations, base station controllers, radio network controllers etc. requesting resources for initiating a communication channel over the communication network. The network slices 610b, 611b, 612b and/or slice instances 610a, 611a, 612a may form the logical networks 131, 132, 133 described above with respect to FIG. 1.

The methods, systems and devices described herein may be implemented as electrical and/or optical circuit within a chip or an integrated circuit or an application specific integrated circuit (ASIC). The invention can be implemented in digital and/or analogue electronic and optical circuitry.

The methods, systems and devices described herein may be implemented as software in a Digital Signal Processor (DSP), in a micro-controller or in any other side-processor or as hardware circuit within an application specific integrated circuit (ASIC) of a Digital Signal Processor (DSP).

The invention can be implemented in digital electronic circuitry, or in computer hardware, firmware, software, or in combinations thereof, e.g. in available hardware of conventional optical transceiver devices or in new hardware dedicated for processing the methods described herein.

The present disclosure also supports a computer program product including computer executable code or computer executable instructions that, when executed, causes at least one computer to execute the performing and computing steps described herein, in particular the method described above with respect to FIG. 1, the method 400 as described above with respect to FIG. 4 and the techniques described above with respect to FIGS. 1 to 6. Such a computer program product may include a readable non-transitory storage medium storing program code thereon for use by a computer. The program code may perform the methods as described above with respect to FIGS. 1 to 6.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A radio communication network, comprising:
   a network orchestration entity, configured to orchestrate a plurality of network resources to set up at least two logical networks of a plurality of logical networks based on respective logical network-specific service level agreements (SLAs);
   a radio scheduler, configured to schedule radio resources of the at least two logical networks based on a scheduling strategy;
   a monitoring entity, configured to monitor performance information from the at least two logical networks; and
   a controller, configured to:
      determine SLA metrics for the at least two logical networks based on the monitored performance information from the at least two logical networks;
      detect a threshold violation of an SLA metric with respect to a set of thresholds associated with a first logical network of the at least two logical networks; and
      adjust the scheduling strategy based on the detected threshold violation.

2. The radio communication network of claim 1, wherein the scheduling strategy is based on applying a set of weights to the radio resources of the at least two logical networks; and
   wherein the controller is configured to adjust the scheduling strategy by adjusting the set of weights.

3. The radio communication network of claim 2, wherein the controller is configured to increase the set of weights applied to the radio resources of the first logical network based on a first detected threshold violation.

4. The radio communication network of claim 3, wherein the controller is configured to further increase the set of weights applied to the radio resources of the first logical network based on a second detected threshold violation.

5. The radio communication network of claim 1, wherein contexts of the thresholds of the set of thresholds associated with the first logical network are prioritized.

6. The radio communication network of claim 1, wherein the controller is configured to indicate the radio scheduler switching a scheduling strategy for scheduling the radio resources based on detecting a specific number of threshold violations or based on detecting a threshold violation of a specific threshold of the set of thresholds.

7. The radio communication network of claim 6, wherein the radio scheduler is configured to switch the scheduling strategy for scheduling the radio resources responsive to the indication received from the controller.

8. The radio communication network of claim 1, wherein the controller is configured to indicate a detection of a specific number of threshold violations or a detection of a threshold violation of a specific threshold of the set of thresholds to the network orchestration entity.

9. The radio communication network of claim 8, wherein the network orchestration entity is configured to re-orchestrate the plurality of network resources responsive to the indication received from the controller.

10. The radio communication network of claim 1, wherein the controller is configured to adjust the scheduling strategy according to a prioritization of data flows transported by the at least two logical networks.

11. The radio communication network of claim 10, wherein the controller is configured to adjust the scheduling strategy based on adjusting a Quality Channel Indicator (QCI) class of the data flows and/or based on a deviation of a monitored Key Performance Indicator (KPI) from a KPI determined by the SLA of the first logical network.

12. The radio communication network of claim 1, wherein distances between the thresholds of the set of thresholds associated with the first logical network are correlated.

13. The radio communication network of claim 1, wherein the controller is configured to normalize a first SLA metric determined for the first logical network with respect to a second SLA metric determined for a second logical network of the plurality of logical networks according to a common or slice-specific evaluation strategy.

14. The radio communication network of claim 13, wherein the controller is configured to adjust the scheduling strategy in the same manner when a threshold violation of a threshold associated with the first logical network and a corresponding threshold of a different level associated with the second logical network is detected.

15. The radio communication network of claim 1, wherein the radio communication network comprises a network according to a fifth generation (5G) or according to a further generation; and
   wherein the at least two logical networks are network slices of the 5G network communicating with a physical layer of the 5G network.

16. A radio communication network, comprising:
   a network orchestration entity, configured to orchestrate a plurality of network resources to set up at least one logical network of a plurality of logical networks based on a logical network-specific service level agreement (SLA);
   a radio scheduler, configured to schedule radio resources of the at least one logical network based on a scheduling strategy;
   a monitoring entity, configured to monitor performance information from the at least one logical network; and
   a controller, configured to:
      determine an SLA metric for the at least one logical network based on the monitored performance information from the at least one logical network;
      detect a threshold violation of the SLA metric with respect to a set of thresholds associated with the at least one logical network; and
      adjust the scheduling strategy based on the detected threshold violation;
   wherein the scheduling strategy is based on applying a set of weights to the radio resources of the at least one logical network;
   wherein the controller is configured to adjust the scheduling strategy by adjusting the set of weights;

wherein the controller is configured to increase the set of weights applied to the radio resources of the at least one logical network based on a first detected threshold violation; and wherein the controller is configured to further increase the set of weights applied to the radio resources of the at least one logical network based on a second detected threshold violation.

17. A radio communication network, comprising:

a network orchestration entity, configured to orchestrate a plurality of network resources to set up at least one logical network of a plurality of logical networks based on a logical network-specific service level agreement (SLA);

a radio scheduler, configured to schedule radio resources of the at least one logical network based on a scheduling strategy;

a monitoring entity, configured to monitor performance information from the at least one logical network; and a controller, configured to:

determine an SLA metric for the at least one logical network based on the monitored performance information from the at least one logical network;

detect a threshold violation of the SLA metric with respect to a set of thresholds associated with the at least one logical network; and adjust the scheduling strategy based on the detected threshold violation;

wherein the controller is configured to normalize a first SLA metric determined for a first logical network of the plurality of logical networks with respect to a second SLA metric determined for a second logical network of the plurality of logical networks according to a common or slice-specific evaluation strategy.

18. The radio communication network of claim 17, wherein the controller is configured to adjust the scheduling strategy in the same manner when a threshold violation of a threshold associated with the first logical network and a corresponding threshold of a different level associated with the second logical network is detected.

* * * * *